United States Patent
Little et al.

(10) Patent No.: US 7,801,446 B2
(45) Date of Patent: Sep. 21, 2010

(54) WAVELENGTH DIVISION MULTIPLEXED OPTICAL COMMUNICATION SYSTEM WITH RAPIDLY-TUNABLE OPTICAL FILTERS

(75) Inventors: Brent Everett Little, Annapolis Junction, MD (US); Lance G. Joneckis, Severna Park, MD (US)

(73) Assignee: Infinera Corporation, Sunnyvale, CA (US)

( * ) Notice: Subject to any disclaimer, the term of this patent is extended or adjusted under 35 U.S.C. 154(b) by 1786 days.

(21) Appl. No.: 10/337,726

(22) Filed: Jan. 8, 2003

(65) Prior Publication Data

US 2007/0258714 A1 Nov. 8, 2007

Related U.S. Application Data

(60) Provisional application No. 60/388,806, filed on Jun. 14, 2002.

(51) Int. Cl.
*H04J 14/02* (2006.01)

(52) U.S. Cl. .............................. 398/85; 398/83; 398/84; 398/87; 398/76

(58) Field of Classification Search .................. 398/76, 398/79, 42, 85, 83, 84, 87
See application file for complete search history.

(56) References Cited

U.S. PATENT DOCUMENTS

| | | | | |
|---|---|---|---|---|
| 5,343,542 A | 8/1994 | Kash et al. | ..................... | 385/31 |
| 5,408,319 A | 4/1995 | Halbout et al. | ............... | 356/352 |
| 5,469,288 A | 11/1995 | Onaka et al. | ................. | 359/189 |
| 5,646,762 A | 7/1997 | Delavaux et al. | ............ | 359/173 |
| 5,701,371 A | 12/1997 | Ishida | .......................... | 385/17 |
| 5,801,830 A | 9/1998 | Seago et al. | ................. | 356/346 |
| 5,943,147 A * | 8/1999 | Vanoli et al. | ................... | 398/27 |
| 6,009,115 A | 12/1999 | Ho | ............................. | 372/92 |
| 6,014,480 A * | 1/2000 | Baney | ........................... | 385/24 |
| 6,052,495 A | 4/2000 | Little et al. | ..................... | 385/2 |
| 6,078,394 A | 6/2000 | Wood | .......................... | 356/352 |
| 6,078,605 A | 6/2000 | Little et al. | ................... | 372/94 |

(Continued)

OTHER PUBLICATIONS

Little et al. *J. Lightwave Technology*, vol. 15, No. 6, Jun. 1997, pp. 998-1005.

(Continued)

*Primary Examiner*—Ken N Vanderpuye
*Assistant Examiner*—Hibret A Woldekidan
(74) *Attorney, Agent, or Firm*—Margaret A. Burke; W. Douglas Carothers, Jr.; David L. Soltz

(57) ABSTRACT

The present invention provides a WDM optical system that includes a tunable filter for selecting one or more optical channels from a WDM optical signal. A portion of a WDM signal enters a first optical filter stage that exhibits a periodic transmission spectrum and possesses individually tunable filter elements. A second optical filter stage receives throughput from the first filter stage and has a periodic transmission spectrum and individually tunable filter elements. A controller electrically communicates with the optical filter to select individual optical channels from the portion of the wavelength division multiplexed optical signal received through the filter input port; each selected optical channel is output via a filter throughput port. In an exemplary embodiment, each tunable filter element is a micro-ring resonator and the micro-ring resonators in the first filter stage have a different free spectral range (FSR) than the micro-ring resonators of the second filter stage.

16 Claims, 8 Drawing Sheets

U.S. PATENT DOCUMENTS

| | | |
|---|---|---|
| 6,195,187 B1 | 2/2001 | Soref et al. ............... 359/114 |
| 6,201,909 B1 | 3/2001 | Kewitsch ................... 385/37 |
| 6,210,973 B1* | 4/2001 | Pettit ........................ 436/172 |
| 6,281,977 B1 | 8/2001 | Paiam et al. ............... 356/480 |
| 6,289,151 B1 | 9/2001 | Kazarinov et al. .......... 385/32 |
| 6,327,036 B1 | 12/2001 | Bao et al. .................. 356/480 |
| 6,344,914 B1* | 2/2002 | Shimojoh et al. ........... 398/17 |
| 6,384,978 B1 | 5/2002 | Singh et al. ................ 359/578 |
| 6,393,186 B1 | 5/2002 | Deacon ...................... 385/50 |
| 6,407,376 B1 | 6/2002 | Korn et al. ............. 250/227.23 |
| 6,411,752 B1 | 6/2002 | Little et al. ................. 385/17 |
| 6,411,756 B2 | 6/2002 | Sadot et al. ................. 385/40 |
| 6,424,763 B1 | 7/2002 | Villeneuve et al. ......... 385/27 |
| 6,426,816 B1 | 7/2002 | Wu et al. .................. 359/122 |
| 6,643,421 B1* | 11/2003 | Chin et al. .................. 385/15 |
| 6,687,032 B1* | 2/2004 | King et al. ................. 398/140 |
| 6,763,052 B2* | 7/2004 | Huang ........................ 372/92 |
| 7,433,600 B2 | 10/2008 | Katagiri et al. ............. 398/85 |
| 2003/0156779 A1* | 8/2003 | Wang et al. ................. 385/15 |
| 2003/0174743 A1* | 9/2003 | Cliche et al. ................ 372/20 |
| 2004/0175180 A1* | 9/2004 | Sugaya ....................... 398/85 |

OTHER PUBLICATIONS

Little et al. *IEEE Photonics Technology Letters*, vol. 10, No. 6, Jun. 1998, pp. 816-818.

Soref et al. *IEEE Photonics Technology Letters*, vol. 10, No. 8, Aug. 1998, pp. 1121-1123.

Little et al. *IEEE Photonics Technology Letters*, vol. 11, No. 2, Feb. 1999, pp. 215-217.

Chu et al. *IEEE Photonics Technology Letters*, vol. 11, No. 6, Jun. 1999, pp. 688-690.

Chu et al. *IEEE Photonics Technology Letters*, vol. 11, No. 11, Nov. 1999, pp. 1423-1425.

Little et al. *Optics Letters*, vol. 25, No. 5, Mar. 1, 2000, pp. 344-346.

Absil et al. *IEEE Photonics Technology Letters*, vol. 12, No. 4, Apr. 2000, pp. 398-400.

Hyrniewicz et al. *IEEE Photonics Technology Letters*, vol. 12, No. 3, Mar. 2000 pp. 320-322.

Little et al. *Optics & Photonics News*, Nov. 2000, pp. 24-29.

Absil et al. *IEEE Photonics Technology Letters*, vol. 13, No. 1, Jan. 2001, pp. 46-51.

* cited by examiner

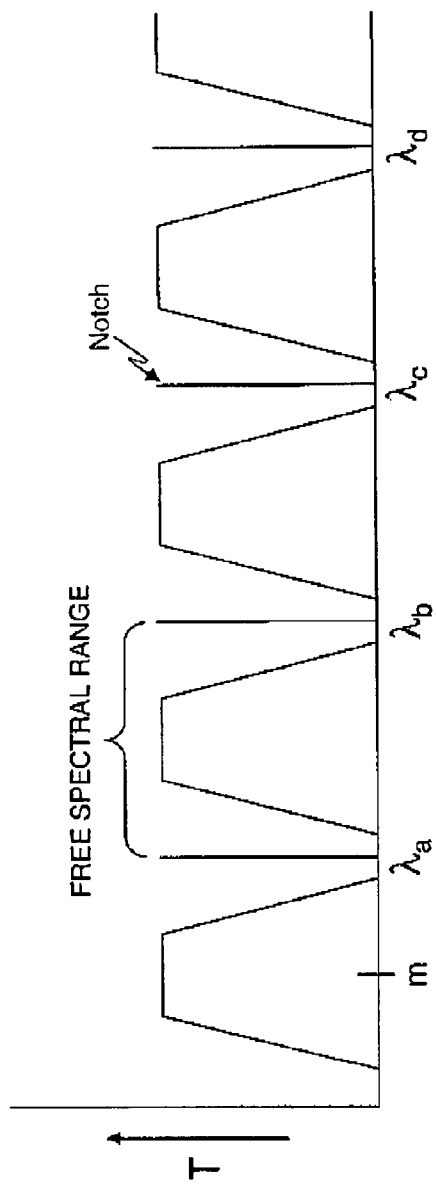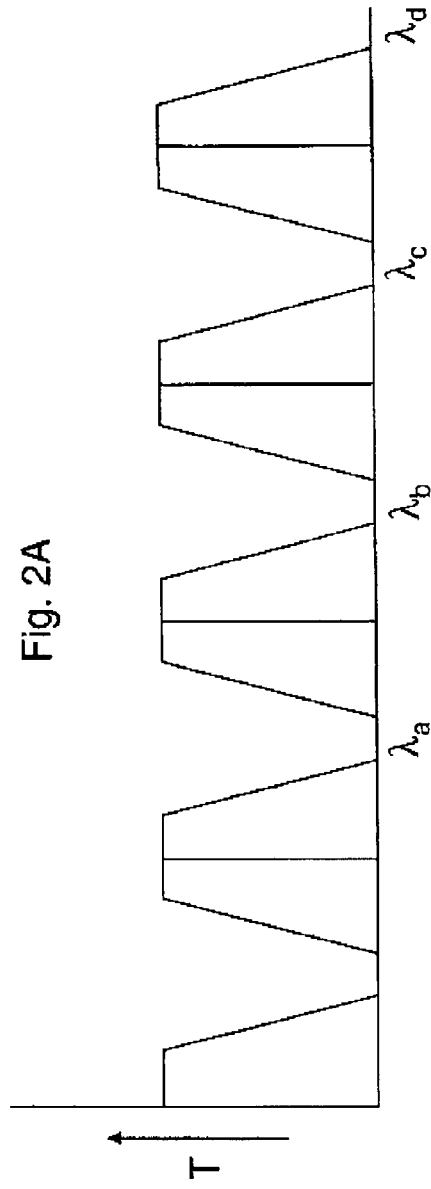

WAVELENGTH DIVISION MULTIPLEXED OPTICAL COMMUNICATION SYSTEM WITH RAPIDLY-TUNABLE OPTICAL FILTERS

CROSS-REFERENCE TO RELATED APPLICATIONS

This application claims priority to provisional application 60/388,806 filed Jun. 14, 2002, the disclosure of which is incorporated by reference herein.

BACKGROUND OF THE INVENTION

1. Field of the Invention

The invention relates to wavelength division multiplexed optical systems generally and, more particularly, to wavelength division multiplexed optical communication systems having tunable optical filters that can rapidly select individual optical channels from a multiplexed optical input signal.

2. Description of the Related Art

Wavelength division multiplexed optical communication systems have rapidly supplanted single channel optical transmission systems for the transportation of voice and data over optical fiber networks. In wavelength division multiplexed (WDM) optical systems, plural optical channels, each channel having a unique optical wavelength, are simultaneously transported over the same optical waveguide (typically a single mode optical fiber). Generally, optical amplifiers are positioned throughout the WDM system for directly increasing the strength of each of the optical channels that comprise the WDM signal without the need to convert the optical channels into electrical signals.

As WDM optical systems proliferate, the complexity of the optical networks increases: optical channels are added, dropped, amplified, switched, terminated, and regenerated. All of these events increase the need for monitoring and control of the individual optical channels that make up the WDM signal. In order to monitor the entire spectrum of the WDM signal, numerous channels must be quickly separated and rapidly measured to develop and accurate "picture" of the WDM signal at a particular moment in time. When large channel counts are involved, on the order of a hundred or more optical channels, it is difficult to quickly scan through the WDM signal and adequately isolate each optical channel to assess the status of the optical network. Such is the case for the so-called "dense" WDM or DWDM in which channel-to-channel spacing is typically less than 1 nanometer.

Various techniques have been developed to examine the spectral position and strength of each of the optical channels that make up the WDM/DWDM optical signal. In one known method a tunable filter is swept" across the spectrum of the WDM optical signal. Since a typical WDM optical signal (in erbium-doped optical amplifier-based systems) can span a range of approximately 80 nanometers, the filter must sweep this entire range to capture each of the optical channels. One type of tunable filter used for this purpose is a Fabry-Perot filter. In this type of filter, two mirrors/reflectors are separated by a cavity. By changing the distance between the mirrors, the cavity size is changed thus altering the wavelength of the optical channel selected by that filter. To change the distance between the mirror elements, an electro-mechanical device, such as a piezoelectric transducer, applies a force to at least one of the mirror elements. Alternatively, the application of thermal energy to change the index of refraction can be used in appropriate material systems to tune the Fabry-Perot filter. Tunable Fabry-Perot filters uses to analyze WDM optical signals are shown in U.S. Pat. No. 6,407,376 to Korn et al. and U.S. Pat. No. 5,408,319 to Halbout et al. Although tunable Fabry-Perot filters such as the ones shown in the patents adequately filter WDM optical signals, the requirement that they be swept across a large spectral range is disadvantageous for WDM optical signals with high channel counts.

Another known technique for creating a tunable filter comprises a fixed demultiplexer (such as an arrayed waveguide grating) followed by a linear array of spatial switches. The demultiplexer takes an input WDM stream and spatially separates the wavelengths. Space switches such as micro-mirrors that are inserted into the paths of the demultiplexed channels can redirect the channel into a specified direction. The switches are mechanically activated. Such filters require several components to be concatenated together and the switch itself is mechanically sensitive. Solid-state switches such as Mach-Zehnder switches can also be used. The number of switches needed grows linearly with the number of channels addressed. Because each channel demultiplexed from a fixed demultiplexer appears at its own distinct spatial port, this port must also be switched to the common output port, increasing complexity and decreasing the performance of the filter.

Another category of tunable filters is the integrated optic delay line filter. In this tunable filter, a series of Mach-Zehnder (MZ) structures is cascaded to give a narrowband filter response. Optionally, the MZs can be integrated onto a dielectric substrate. However this type of filter tends to be very long and becomes longer the narrower the passband becomes. The number of channels over which the filter can be tuned depends linearly on the number of individual MZs. Consequently, this type of filter is not suitable for WDM optical signals having high channel counts. Additionally, each MZ needs to be tuned requiring considerable electrical power. The tuning algorithm to access a channel is complicated, and the filter shape is not the most desirable.

There is a need in the art for improved tunable optical filters that can rapidly select each optical channel in a wavelength division multiplexed optical signal. Such tunable filters could be used for a variety of channel monitoring, demultiplexing, and add-drop devices in WDM optical systems.

SUMMARY OF THE INVENTION

The present invention provides a wavelength division multiplexed optical communication system that includes a tunable filter for selecting one or more optical channels from a wavelength division multiplexed optical signal. By rapidly selecting optical channels, the tunable filter permits accurate monitoring of the optical system including measurements needed for signal-to-noise computations, gain equalizations systems, source laser feedback and tuning, etc.

According to one embodiment of the invention, a source of a wavelength division multiplexed optical signal is provided. Typically, in a point-to-point system, plural optical channels are generated by sources lasers and modulators and aggregated onto an optical transmission medium such as a single mode optical fiber and optically-amplified along the transmission path. The wavelength division multiplexed optical signal includes plural optical channels, each of which has a unique channel wavelength.

In the WDM optical system, a tunable optical filter is provided. This filter is configured to receive at least a portion of the wavelength division multiplexed optical signal through a tunable filter input port. Typically a portion of the WDM optical signal would be routed to the filter via an optical tap which diverts a portion (e.g., 1%, 2%, 5%) of the WDM signal to the filter input port. The tunable optical filter includes at least a first optical filter stage that exhibits a periodic transmission spectrum and possesses individually tunable filter elements. The tunable optical filter further includes a second optical filter stage receiving the output of the first filter stage. The second optical filter stage has a periodic transmission spectrum and individually tunable second filter elements. A controller electrically communicates with the optical filter to select individual optical channels from the portion of the wavelength division multiplexed optical signal received through the tunable filter input port; each selected optical channel is output via a filter throughput port.

In an exemplary embodiment, each of the tunable filter elements is a micro-ring resonator. The micro-ring resonators in the first stage of the optical filter have a set free spectral range (FSR); the micro-ring resonators of the second stage of the optical filter have a set free spectral range different from the free spectral range of the micro-ring resonators of the first optical filter stage. Selective tuning of the micro-resonators by thermal or electrical energy allows a single optical channel to be filtered from the WDM optical signal.

BRIEF DESCRIPTION OF THE DRAWINGS

FIG. 2(a) depicts the periodic spectral response of the tunable filter of FIG. 1 in a neutral (off) position.

FIG. 2(b) depicts the periodic spectral response of the tunable filter of FIG. 1 in a tuned position to change the set of signals that are passed by the filter.

DETAILED DESCRIPTION

Figure 1:
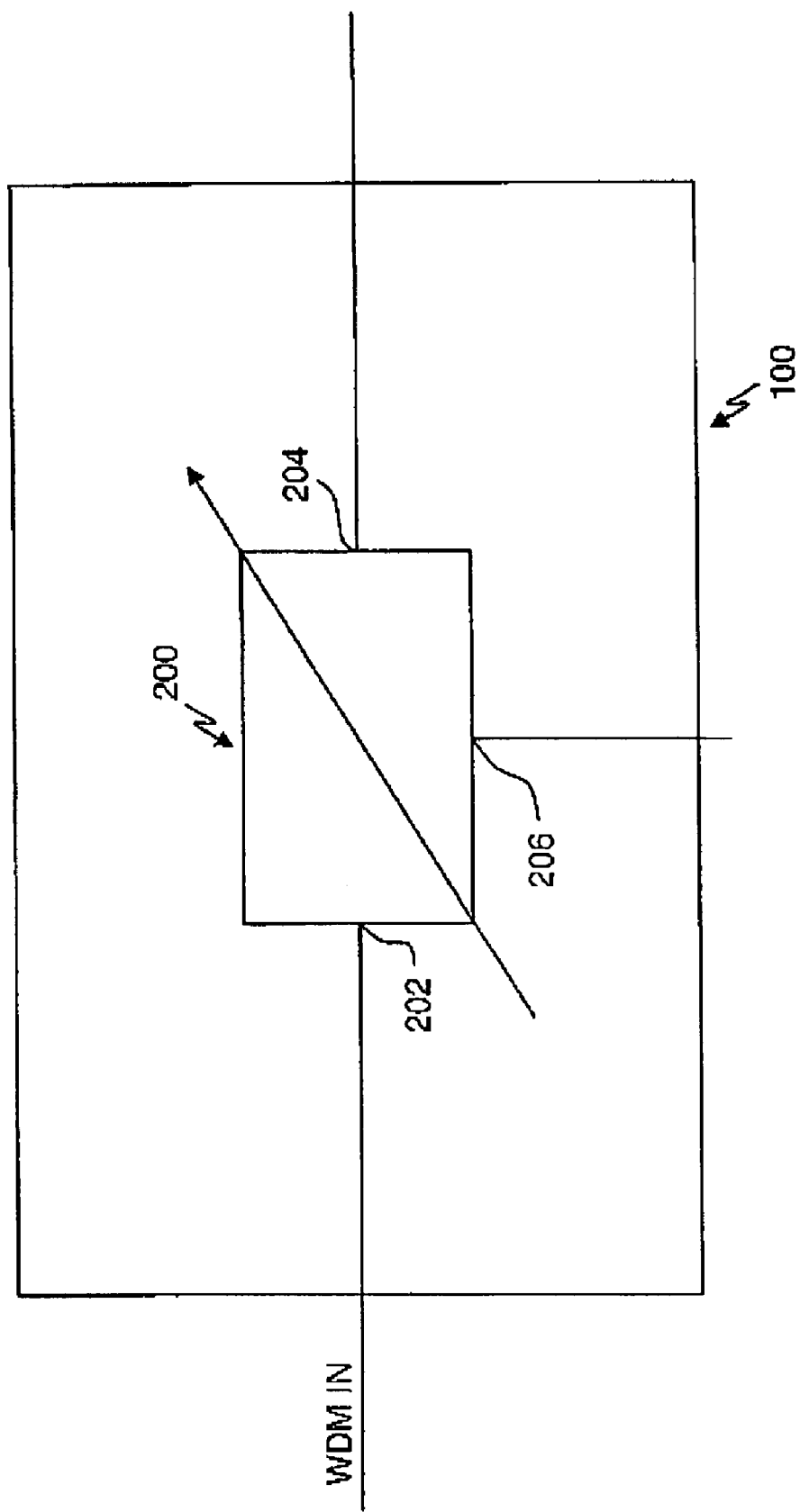
FIG. 1 schematically depicts a tunable optical filter for use with wavelength division multiplexed optical signals.

Turning now to the drawings in detail, FIG. 1 schematically depicts a tunable optical filter used in connection with a wavelength division multiplexed optical system according to one embodiment of the present invention. In its most basic form, the tunable filter 100 includes a first filter element 200 that produces a periodic filtering response. The filtering element 200 has an input port 202 and a throughput port 204. The input port is configured to receive at least a portion of a wavelength division multiplexed optical communication signal comprised of plural optical channels, each channel having a unique optical wavelength. The term "wavelength division multiplexed" as used herein includes all forms of frequency multiplexing plural optical signals on an optical transmission medium, regardless of the spacing of adjacent channels, their manner of generation, modulation, aggregation, or separation such that they are input to port 202 of optical filter 100. Typically, plural optical channels are generated by laser diodes, directly or externally modulated, and aggregated onto an optical waveguide, such as a single mode optical fiber via a multiplexer, add-drop multiplexer, or various other aggregation techniques that are known in the art. A review of optical networks, including WDM networks, can be found in Ramaswami et al., *Optical Networks: A Practical Perspective* (Morgan Kaufman, © 1998), the disclosure of which is incorporated herein by reference. To route a portion of the optical signal to optical filter input port 202, typically an optical tap is positioned along a transmission medium at a point where optical signal monitoring is desired (e.g., at add-drop nodes, adjacent optical amplifiers, adjacent channel generation and termination points, etc.). The optical tap typically selects a given percentage (e.g., 1%, 2%, or 5%) of the WDM optical signal while permitting the remaining portion to pass unimpeded. However, it is noted that for certain applications (e.g., add-drop multiplexing) it is desirable to have the entire WDM optical signal enter filter input port 202.

The filter element 200 has an input port 202, a throughput port 204, and, optionally, a drop port 206. An exemplary periodic filtering response for filter element 200 is depicted in FIG. 2A. FIG. 2A shows the filter element throughput at port 204 with transmission plotted as a function of wavelength. The throughput channels are those optical channels that lie in the portions of the optical spectrum that are transmitted by the filter. Thus an optical signal located at position "m" would be transmitted by filter stage 200 and the optical channels located at positions $\lambda_a$, $\lambda_b$, $\lambda_c$, and $\lambda_d$ would not be transmitted by filter element 200; optionally, these channels would exit the filter element 200 at drop port 206 (the drop port may alternatively terminate the channels that are not throughput by the filter). Each spectral region for which a channel would be blocked (or dropped) by the filter element 200 is referred to as a "notch." The spectral distance from the center of one notch to the center of the next adjacent notch is referred to as the "free spectral range" (FSR) of the filter. As seen in FIG. 2A, this is the distance between $\lambda_a$ and $\lambda_b$. Because filter element 200 has a periodic response (each period being equal to the free spectral range of the device) plural channels may be throughput and plural channels may be blocked/dropped by the filter stage depending upon the particular selection of the FSR in the filter design process.

For example, if a signal being filtered is a WDM optical telecommunications signal, the free spectral range of the filter could be designed to be equal to the interchannel spacing. Thus, as seen in FIG. 2A, the distance between the channel marked $\lambda_a$ and the channel marked $\lambda_b$—the free spectral range of the filter—is equal to the interchannel spacing (i.e., the distance between the channel marked $\lambda_a$ and the channel marked $\lambda_b$). In the "off" or "untuned" condition, the channels marked $\lambda_a$, $\lambda_b$, $\lambda_c$, and $\lambda_d$ are blocked/dropped by the filter. A filter that drops every $n^{th}$ channel and is said to have a Free Spectral Range (FSR) of n channels. If each channel is separated by some wavelength range such as x nanometers, the filter is said to have an FSR of n*x nanometers. Alternatively, if the FSR is equal to twice the interchannel spacing (n=2), then every other channel would be throughput and every other channel would be blocked/dropped by the filter element in the "off" or "untuned" condition.

Although the free spectral range of the optical filter may be selected to be some multiple of the interchannel spacing of a selected WDM system, it is understood that the free spectral range can be arbitrarily selected by the filter designer to be any frequency range through the appropriate choice of the individual filtering elements. The choice of a particular free spectral range depends upon the selected filter application and the desired number of filter stages, to be discussed in more detail below.

Because the filter is tunable, the spectral position of the notches may be shifted through the application of electrical energy to a filter material exhibiting an electro-optic effect, mechanical energy to change the resonant cavity size for Fabry-Perot devices, or thermal energy to change the refractive index of a material exhibiting a thermo-optic effect. By shifting the location of the filter notches, a different set of channels will be throughput by the filter stage. For example, if filter stage 200 having the spectral response depicted in FIG. 2A is tuned (through the application of electrical, mechanical, or thermal energy as described above) such that the notches are shifted by half the free spectral range (e.g., moved by one-half of an interchannel spacing) then the channels previously blocked/dropped by filter stage 200 will be throughput by the filter. This shifting is depicted in FIG. 2B. As seen in FIG. 2B, the shift of the notches by half a channel spacing causes channels $\lambda_a$, $\lambda_b$, $\lambda_c$, and $\lambda_d$ to be transmitted to throughput port 204 instead of being blocked/dropped in the off position. A filter having the periodic response of FIG. 2 such as filter stage 200 can be referred to as a "notch filter" due to the periodic series of notches that block/drop optical channels located within the spectral region of the notch. When the FSR of the filter is configured to be equal to a channel wavelength, the notch filter may be used as an optical switch. In the "off" position, all the channels will be dropped at drop port 206 (or, optionally, terminated); when tuned to shift the notches by half a channel spacing (half the filter FSR) all the channels will be throughput through the filter and exit port 204. Each notch has a bandwidth that is determined by the actual physical element inside the filter element and which is ultimately dictated by the requirements of a WDM signal to be filtered.

Figure 3:
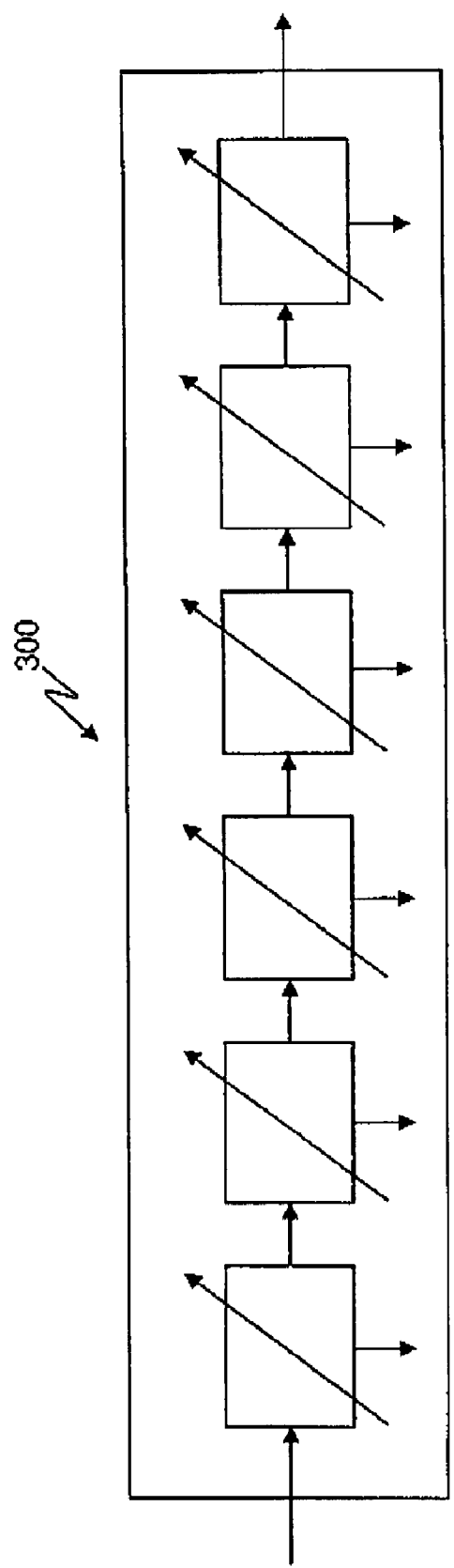
FIG. 3 schematically depicts a tunable optical filter including plural concatenated tunable filter elements.

An "all-notch" filter 300 is a series of notch filters connected throughput port to input port as depicted in FIG. 3. An all-notch filter wherein each filter element has a free spectral range of n channels (i.e., the distance between adjacent periodic notches is equal to n channels) will be comprised of n serially connected cells. If the overall filter is to have the ability to selectively filter a WDM optical signal having N channels, then the value of n satisfies the relationship $n*(n-1) \geq N$. In the n-serially coupled all-notch filter, there will be some configuration where one of the filter elements drops $\lambda_i$, one of the filter elements drops $\lambda_2$ and so on up the first n channels. That is, each of the n filter elements drops one of, and only one of the channels $\lambda_1$ to $\lambda_n$. Because each filter element not only drops wavelengths $\lambda_i$ but also $\lambda_{i+n}$, $\lambda_{i+2n}$ etc., the series of n-filter elements will drop every single channel in the entire spectrum occupied by the total number (N) of optical channels in the WDM signal.

Figure 4:
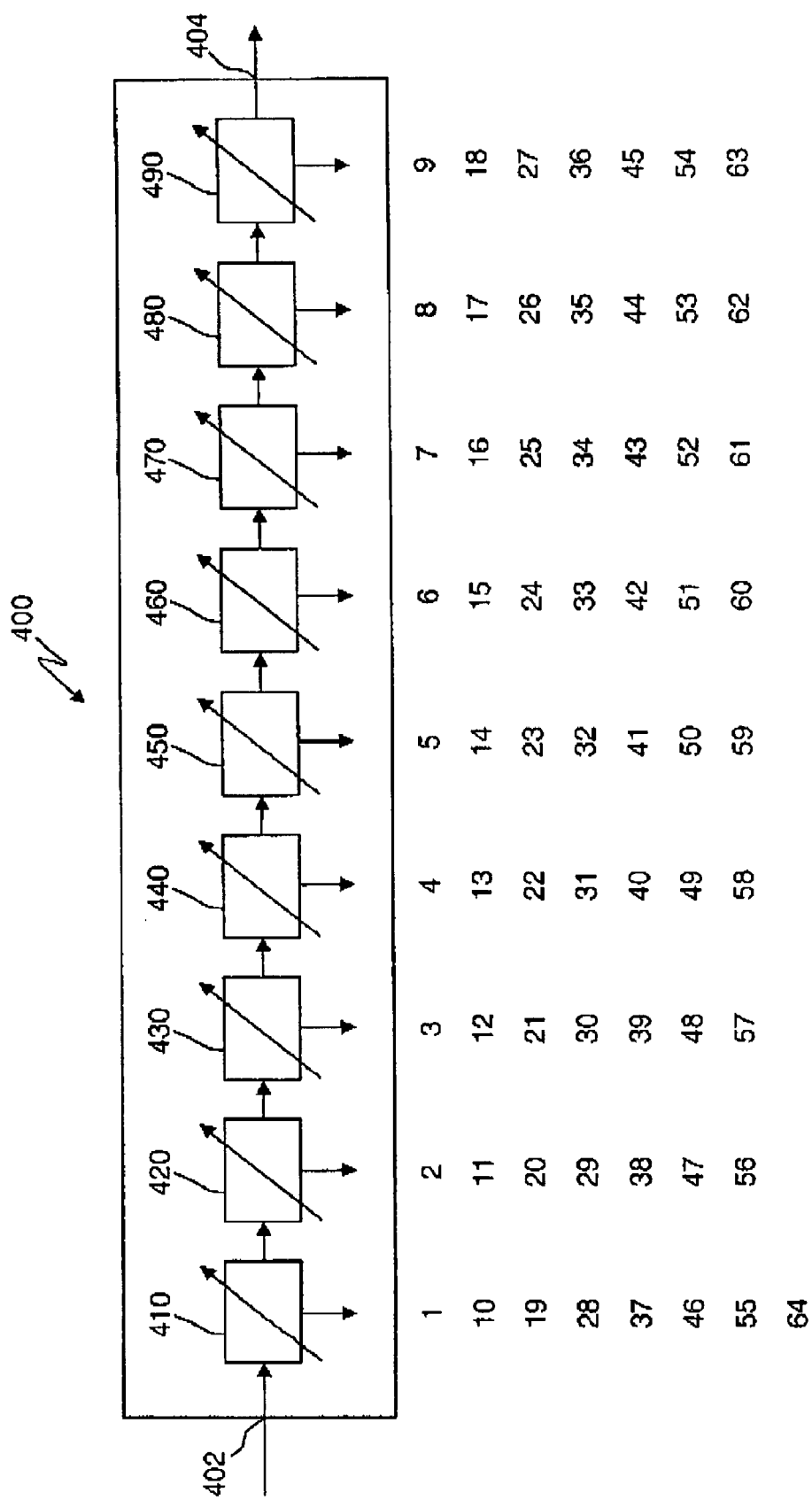
FIG. 4 schematically depicts a tunable filter including nine tunable filter elements configured to filter all the optical channels of a 64-channel WDM optical input signal.

An example of an "all-notch" filter for a 64 channel WDM optical signal is depicted in FIG. 4. Using the formula above, the square root of 64 is 8; adding one yields 9. Thus, to drop all 64 channels, the all-notch filter 400 uses 9 filtering elements 410, 420, 430, 440, 450, 460, 470, 480, and 490; each of the filtering elements has a free spectral range of 9 (multiples of the interchannel spacing). In the ambient off (untuned) condition, all of the channels will be blocked/dropped by the filter; the channels dropped by each of the filtering elements is listed below that element.

Each of the filtering elements is tunable using the techniques described above. If tunable filtering element 410 is tuned to shift its notches to allow its channels to pass (e.g., if tuned by one channel spacing, then it will have the same spectral response as filter element 420; note however, that is not necessary to tune the filter element such that it has the same response as another filter element-the filter element need only be tuned such that its notches are sufficiently shifted to permit the channels previously blocked/dropped by that filter element to be throughput). Thus, when a 64-channel WDM optical signal is input to port 402, the tuned filter element 410 permits channels 1, 10, 19, 28, 37, 46, 55, and 64 to be throughput via throughput port 404; the remaining optical channels are blocked/dropped by filtering elements 420-490. If the channels are dropped, they can be re-aggregated using various multiplexing techniques; in this manner, the "throughput" port 404 of filter 400 could function as a "drop port" of an add-drop multiplexed (requiring further channel selection to isolate each individual signal) while the "dropped" channels could function as the "through" channels of a WDM optical signal.

Figure 5:
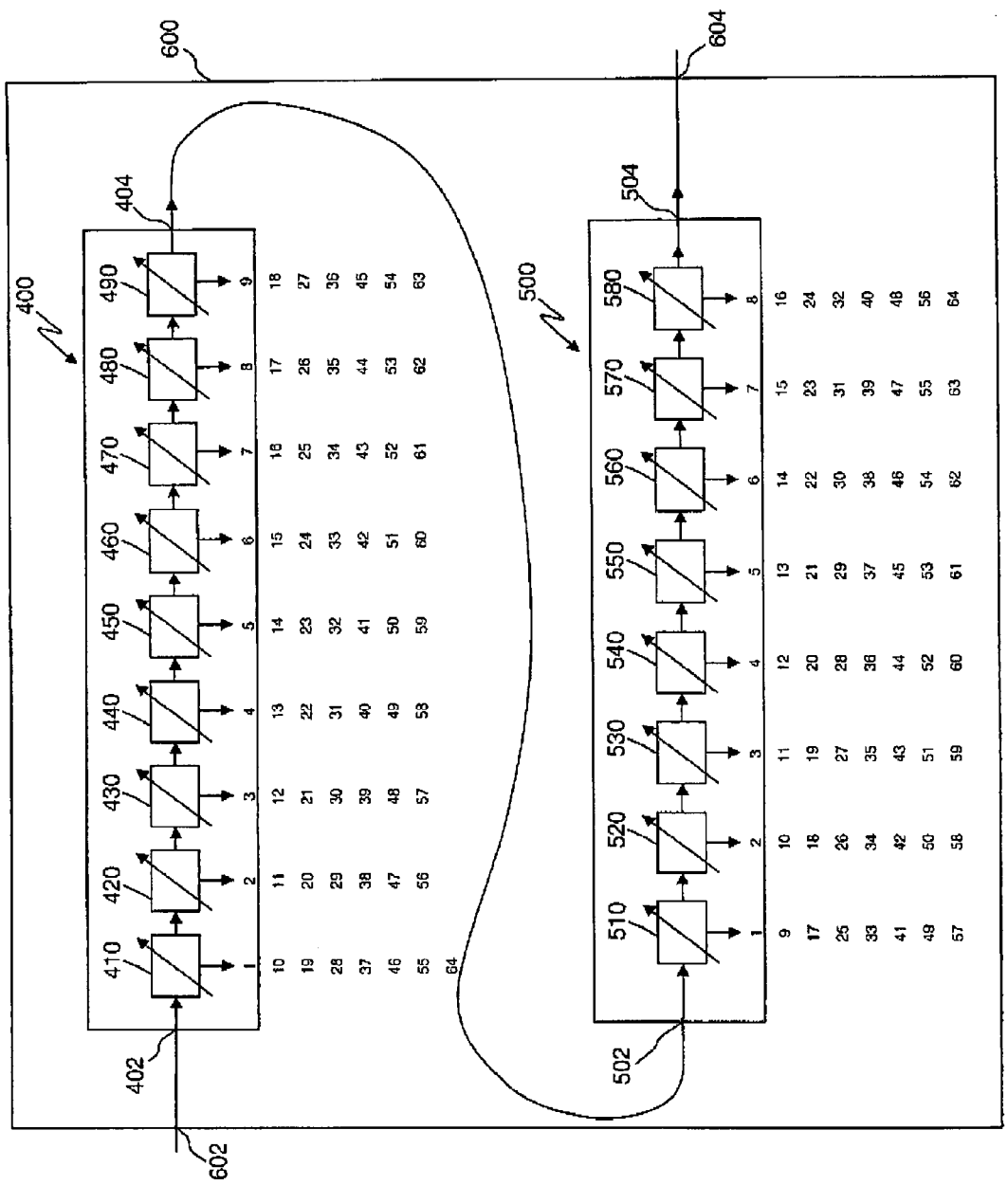
FIG. 5 schematically depicts a two-stage tunable optical filter having plural tunable filtering elements configured to be capable of filtering individual optical channels from a 64-channel WDM optical input signal.

To create an optical filter in which a WDM signal can be input and a single optical channel output, a second filter stage 500 is concatenated to the first filter stage 400 to receive the throughput signal from the first filter stage. Thus, the input to port 502 of the second filter stage is the throughput from port 404 of the first filter stage 400. The free spectral range of each of the filter elements of the second stage 500 of the two-stage filter 600 is selected to be one channel wavelength less than the free spectral range of the first stage 400. For the 64-channel WDM signal used as the example of FIG. 4, the FSR of the second stage is n−1; since the FSR of the first filter stage 400 is 9, the FSR of the second stage is 8. As seen in FIG. 5, the second stage 500 of the filter has 8 tunable filter elements, each of which blocks/drops the optical channels listed beneath the respective elements.

To obtain any optical channel from the 64 channel input WDM signal, one tunable filter element from the first filter stage 400 and one tunable filter element from the second filter stage 500 are tuned to allow the channels that are blocked/dropped in the "off" or neutral state to be passed. Due to the appropriate selection of the free spectral range, only one channel will be throughput by the filter 600 at the overall throughput port 604. For example, if channel 47 is desired to be the throughput channel, filter element 420 is tuned, permitting channels 2, 11, 20, 29, 38, 47, and 56 to exit first filter stage throughput port 404. To permit passage of channel 47 through the second stage, filter element 570 is tuned. Since the second filter stage 500 only has channels 2, 11, 20, 29, 38, 47, and 56 input via input port 502, only channels 2, 11, 20, 38, and 56 need to be blocked/dropped by the second filter stage. Channel 2 will be blocked/dropped by filter element 520, channel 11 by filter element 530, channel 20 by filter element 540, channel 29 by filter element 550, channel 38 by filter element 560, and channel 56 by filter element 580. Since filter element 570 has been tuned to deselect its channels, channels 7, 15, 23, 31, 39, 47, 55, and 63 would be passed by the second stage of the filter. However, since only channel 47 reaches the input of the second stage, the tuning of element 570 to deselect its channels results in only channel 47 being output by two-stage filter 600 via throughput port 604.

It is important to note that the selection of any input channel does not require tuning of any filter element by more than one channel wavelength, permitting rapid selection of the desired channel. Further, the selection of a particular channel is "hitless;" that is, the selection of channel 23 followed by the selection of channel 56 does not require scanning through channels 24-55 prior to reaching the configuration for the throughput of channel 56 by the filter.

In an exemplary embodiment of the present invention, the tunable filtering elements are selected to be ring resonators. A typical resonator device includes a ring-shaped waveguide acting as the periodic wavelength-selecting element; the resonator is positioned adjacent on or more waveguides that deliver channels to and from the resonator ring. For planar configurations, an optical bus for transporting a WDM optical signal is defined as a planar waveguide with tunable micro-ring resonators evanescently coupled to the optical waveguide. The net optical path around the resonator ring defines the resonant frequency and hence the periodic response of each of the tunable micro-ring filtering elements. Details of micro-ring resonators, including fabrication techniques and suitable material systems such as compound glasses are found in Little et al., "Toward Very Large-Scale Integrated Photonics," *Optics and Photonics News*, November, 2000, pp. 25-29 and Little et al., "Vertically Coupled Glass Micro-Ring Resonator Channel Dropping Filters," *IEEE Photonics Technology Letters*, Vol. 11, 1999, pp. 215-217, and U.S. patent application Ser. No. 09/944,207 the disclosures of which are incorporated by reference. Further details of resonators suitable for use as the tunable filtering elements of the present invention are found in published patent documents JP2000298215, WO0050938, WO0210814, and WO0048026, the disclosures of which are incorporated by reference herein. Note that although circular resonators are depicted, resonator elements may take on a variety of geometric shapes as is known in the art.

Tuning of micro-ring resonators can be performed in a variety of ways depending upon the material system selected for the device. For $Si/SiO_2$ systems, thermal tuning is used to change the index of refraction of the micro-ring resonator and consequently shift the notch positions in the manner depicted in FIG. 2. For GaAs/AlGaAs systems, an electric field is applied to tune the device via the electro-optic effect.

Figure 6:
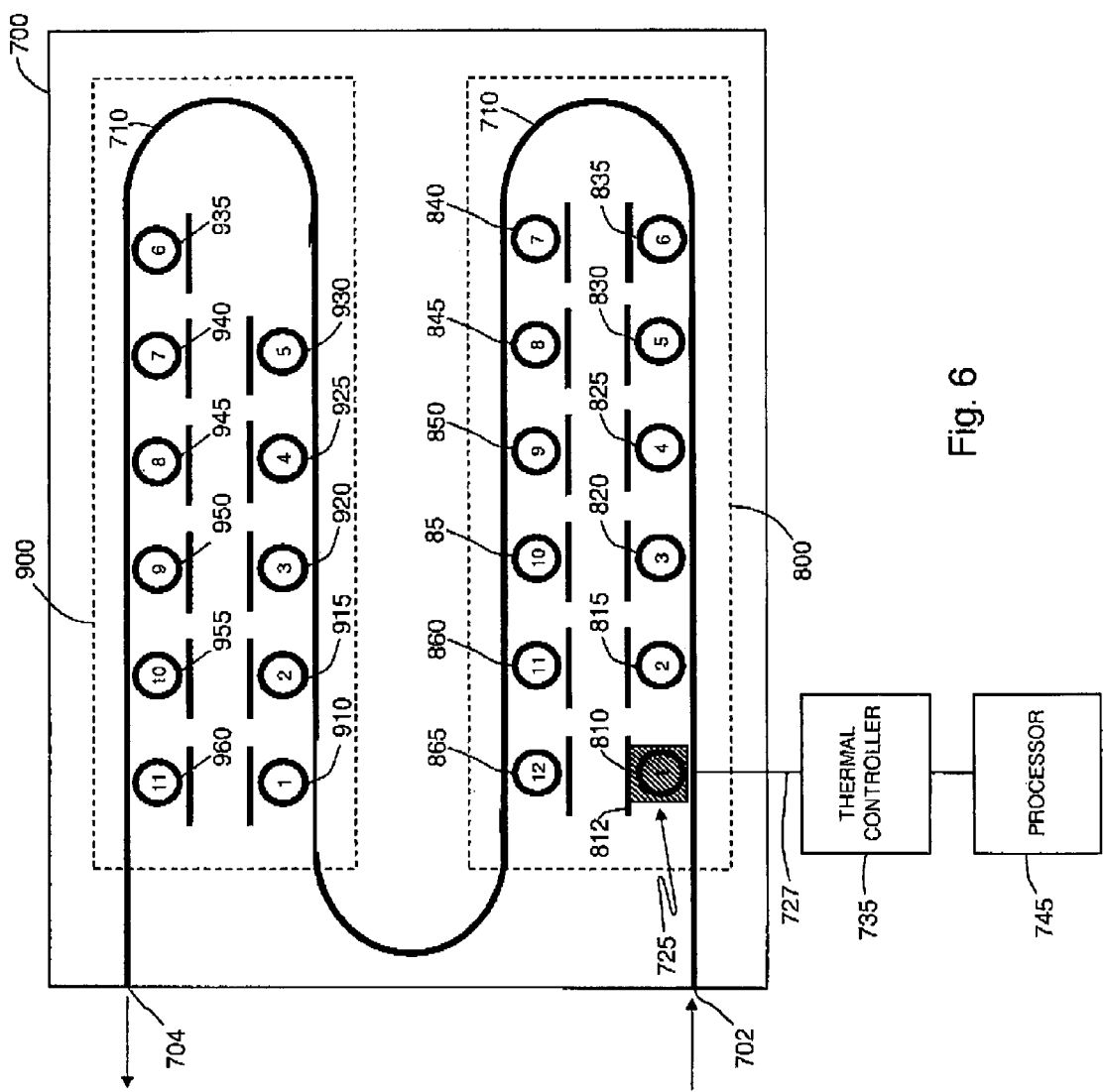
FIG. 6 schematically depicts a two-stage tunable optical filter using micro-ring resonators as tunable optical filtering elements.

FIG. 6 depicts a two-stage tunable optical filter employing micro-ring resonators according to one embodiment of the present invention. FIG. 6 shows the top-down view of an optical circuit 700 layout for a tunable filter capable of selecting individual optical channels from a 132 channel WDM optical signal. In an exemplary embodiment, circuit 700 comprises a material system including one or more of silicon, silicon nitride, silicon oxynitride, and silicon carbide. The circuit comprises a first stage 800 comprising twelve tunable filter elements (micro-ring resonators) 810, 815, 820, 825, 830, 835, 840, 845, 850, 855, 860, and 865. The numbers inside each ring indicate the first number of the optical channel selected by the ring; the rings have an FSR of 12channels in the first stage. The second stage 900 of tunable filter 700 includes eleven tunable filter elements 910, 915, 920, 925, 930, 935, 940, 945, 950, 955, and 960. An optical bus waveguide 710 traverses both the first filter stage 800 and the second filter stage 900. Input port 702 of tunable filer 700 receives the 132-channel WDM optical signal to be filtered while throughput port 704 outputs the selected optical channel. Optical channels selected by the ring resonators are evanescently coupled to "drop" waveguides 812 (only one of which is labeled in FIG. 6 for clarity). These channels may be terminated or the waveguides extended and the channels aggregated to create a large number of "through" channels while using the channel exiting the throughput port as a "drop" optical channel.

For the material system selected, thermal tuning is used in order to change the refractive index of the filtering elements/micro-ring resonators. For thermal tuning, a resistance-heating pad is patterned over the area of the ring. Only a single pad 725 is depicted in FIG. 6 for clarity of presentation. Resistance heating pad 725 receives a signal from thermal controller 735 via electrical path 727 when filtering element 810 is to be tuned. Although not shown in FIG. 6, thermal controller 735 communicates with each of the resistance heating pads positioned adjacent the filtering elements. An optional processor 745 (which may be integrated with thermal controller 735) sends control signals to the thermal controller indicating which resistance heating pads are to be activated, thus shifting the filtering response of the individual micro-ring resonators. Using thermal tuning, the selection of optical channels may be made of the order of milliseconds. Note that the need to tune individual filter elements over such a small spectral distance for channel selection greatly reduces the power consumption of the filters compared to tunable filters that must be shifted over a much larger spectral range.

Although not shown in FIG. 6, plural coupled rings may be used as the tunable filter elements for improved filter lineshape. Such tunable coupled ring resonators used as filter elements are shown in Hryniewicz et al., "Higher Order Filter Response in Coupled Microring Resonators, *IEEE Photonics Technology Letters*, Vol. 12, No. 3, March, 2000, pp. 320-322, the disclosure of which is incorporated by reference.

Figure 7A:
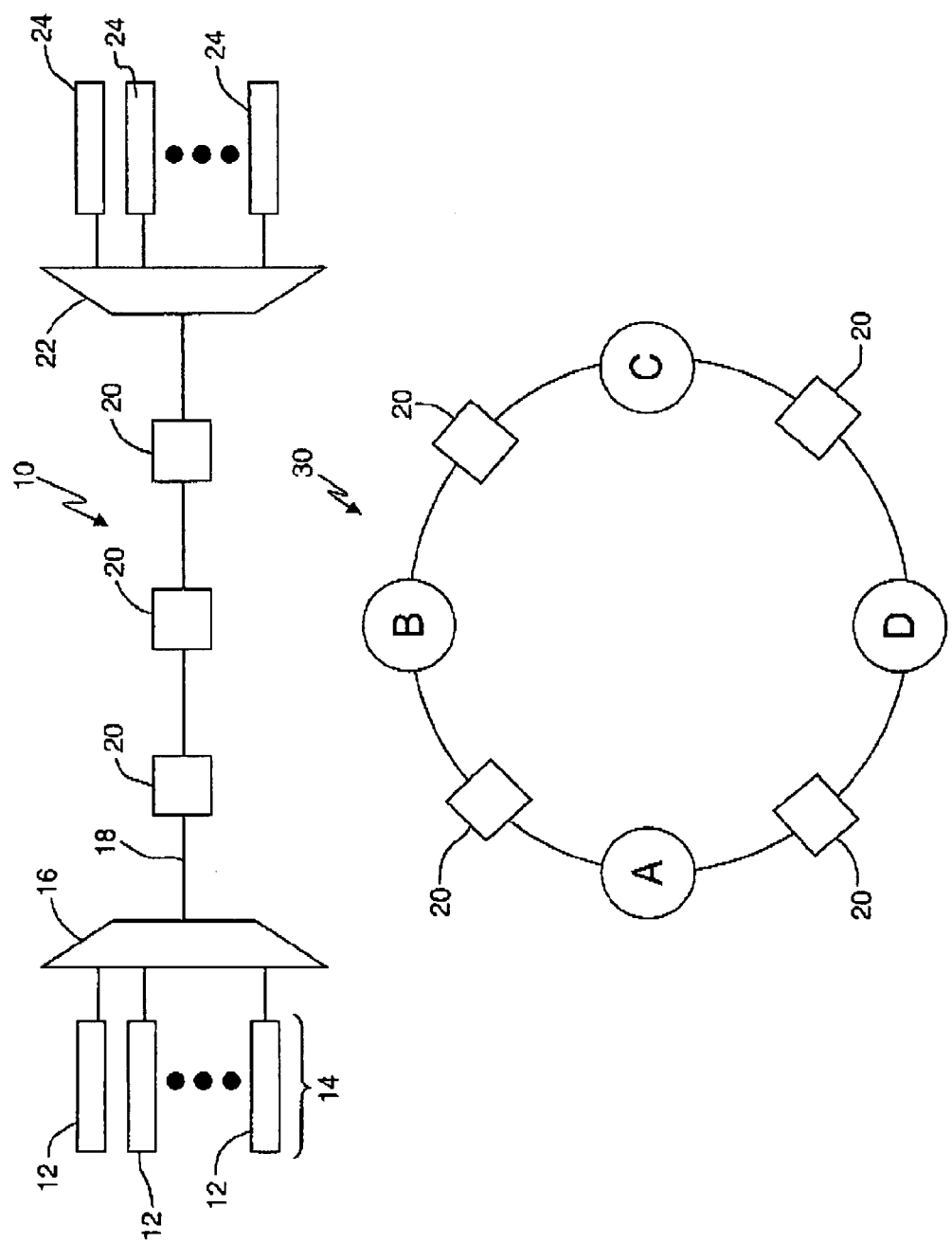
FIG. 7A shows examples of optical networks that can employ the optical filters of the present invention.

As discussed above, the tunable filter systems of the present invention are capable of being used in numerous situations where it is desirable to monitor individual channels of a wavelength division multiplexed optical signal. FIG. 7A depicts two configurations for wavelength division multiplexed optical networks. System 10 is a schematic representation of a point-to-point WDM optical system with a WDM optical signal source 14 comprising plural optical channel generators 12 (typically a DFB laser and a direct or external modulator), multiplexer 16, transmission fiber 18, optical amplifying nodes 20, demultiplexer 22, and optical channel receivers 24.

Figure 7B:
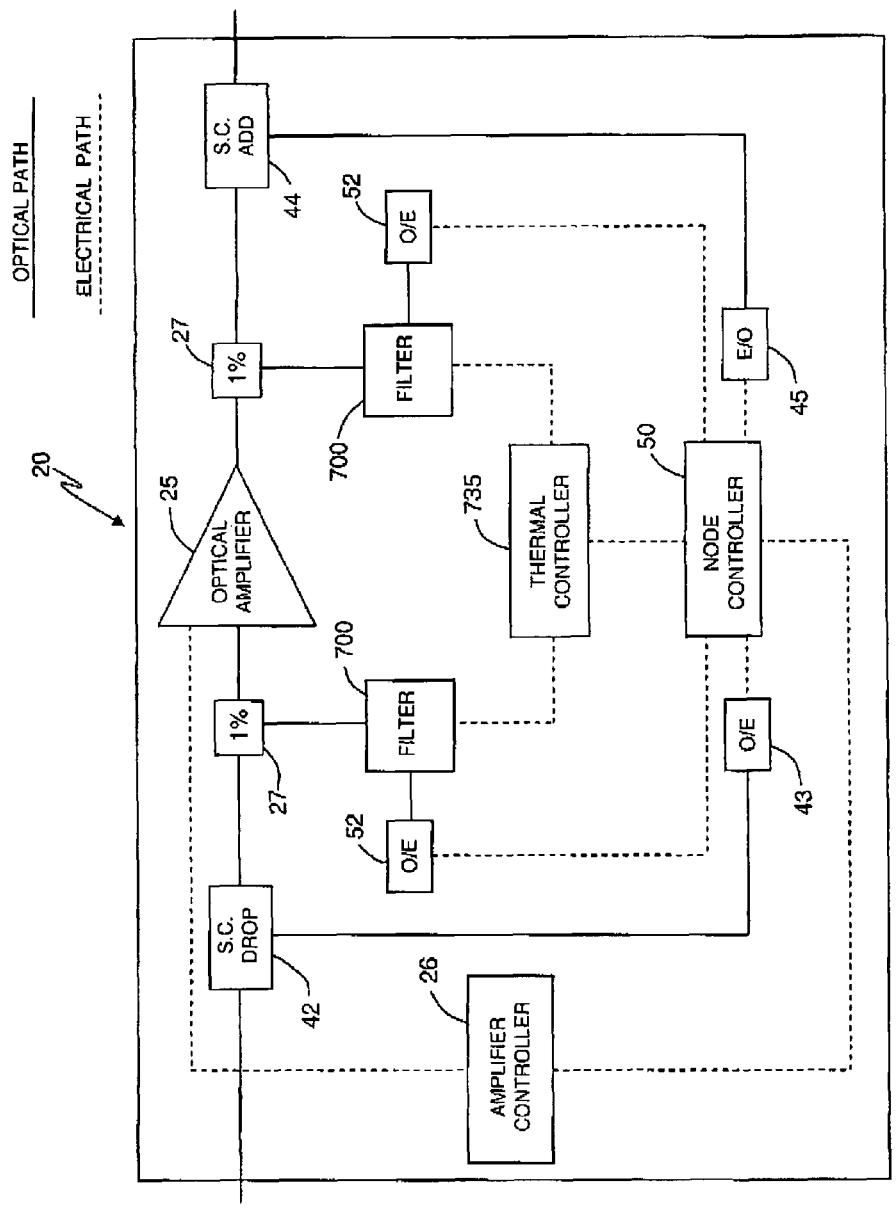
FIG. 7B depicts an example of an optical network amplifier node including the optical filters of the present invention.

FIG. 7A also depicts optical ring network 30 in which channels are continuously added and dropped (e.g., metropolitan optical ring networks) at optical nodes A, B, C, and D. Intermediate optical amplifying nodes 20 are also positioned in optical network 30. Note that these are merely schematic representations of WDM networks; the tunable filters of the present invention may be used in numerous other network configurations (e.g., mesh networks) and at various other locations in the system (transmitter, receiver, multiplexer, etc.). The tunable filters of the present invention are compatible with any WDM optical signal (e.g., telecommunication signals, data signals, signals carried in solid state devices) and in non-network contexts (analytical tools, etc.). Various exemplary networks and WDM optical signal applications are shown in *Optical Networks: A Practical Perspective*, incorporated by reference above, Stern et al., *Multiwave Optical* Networks, and Paul et al, *Fiber Optic* Networks, the disclosures of which are incorporated by reference herein. A schematic representation of an optical node 20 incorporating the tunable optical filters of the present invention is shown in FIG. 7B. Although FIG. 7B is an optical amplifying node 20, it is understood that the tunable optical filters may be positioned at numerous other locations in the optical networks. Amplifying node 20 includes optical amplifier 25 such as an EDFA or a Raman-bases amplifier, optical taps (shown here as 1% taps) and tunable optical filters 700 (the 64-channel filters 700 are shown; the selection of a particular filter design will depend upon the characteristics of the WDM optical signal). Optionally, an optical service channel is add/dropped at node 20; element 42 represents a service channel drop (e.g., using a multilayer interference filter) while element 44 represents a service channel add. The optical service channel is converted to an electrical signal using optical-to-electrical converter 43; the electrical signal is routed to node controller 50. A portion of the WDM optical signal is diverted to tunable filters 700 through optical tap 27 both before the optical amplifier and after the optical amplifier 25. Optical channels selected by filters 700 are sent to optical-to-electrical converters 52 then routed to node controller 50. Node controller 50 directs thermal controller 735 to select particular optical channels. By positioning tunable filters 700 before and after amplifier 25, the gain characteristics of the optical amplifier can be determined. Sending the information to the node controller permits modification of the amplifier parameters (e.g., pump laser power, amplifier attenuator characteristics, etc.) via amplifier controller 26. Further, information concerning the filtered optical signals sent to the node controller may be sent to other nodes in an optical system by placing the information on the service channel electrical-to-optical converter 45 (downstream, as shown, or upstream via communication with an outbound upstream service channel on a second transmission waveguide) where it is added to the amplified WDM optical signal through service channel add element 44.

Optical filters according to the present invention have numerous applications within optical systems. For example, the filters of the present invention can be used in broadcast and select optical networks in which a portion of a broadcast signal is selected (e.g., via an optical tap positioned at an optical node). Using the tuning techniques described above, a single optical signal is selected, creating a reconfigurable add-drop node. The filters of the present invention are also useful in optical channel provisioning (the process of bringing a new optical channel on-line) since the filters can be tuned to rapidly cycle through all of the channels of a WDM system, including the newly-provisioned channel, allowing network management systems to be updated, power levels equalized, etc.

The tunable optical filters of the present invention can be substituted for conventional static filters, resulting in inventory reduction; instead of optical line cards each statically configured for a single optical channel, the tunable optical filters can be configured to select any optical channel. Thus, only one type of replacement line card would need to be stocked, ensuring that a usable part is always available.

While the above invention has been described with reference to the particular exemplary embodiments, many modifications and functionally equivalent elements may be substituted without departing from the spirit and contributions of the present invention. For example, other optical filter elements exhibiting a periodic response may be used as the tunable filter elements of the tunable filter; further the individual filtering elements need not be the same in each filter stage or even within a particular filter stage. While exemplary embodiments have been described with one or two filter stages, filters having more than two filter stages are encompassed by the disclosure of the present invention, each filter stage having a different free spectral range. Additional filter stages provide a larger tuning range since the number of addressable channels for a three-stage filter are $n*(n-1)*(n-2)$ where n is the FSR of stage 1, n−1 is the FSR of stage 2, and n−2 is the FSR of stage 3. Also, for a given number of WDM channels N, the FSR of each of the three stages is less than those of an equivalent 2-stage device and the FSR is close to the cube root of N, rather than close to the square root of N.

Accordingly, modifications and functionally equivalent elements such as those suggested above, but not limited thereto, are considered to be within the scope of the following claims.

What is claimed is:

1. A wavelength division multiplexed optical communication system comprising:
 a controller;
 a wavelength division multiplexed optical signal source outputting a wavelength division multiplexed optical signal including a plurality of optical channels, each of the plurality of optical channels having a corresponding one of a plurality of wavelengths, adjacent ones of the plurality of optical channels being spectrally spaced from one another by a channel spacing; and
 a tunable optical filter having a tunable filter input port and a tunable filter throughput port, the tunable optical filter being configured to receive at least a portion of the wavelength division multiplexed optical signal through the tunable filter input port, the tunable optical filter including a first optical filter stage, the first optical filter stage having a first periodic transmission spectrum and a plurality of cascaded individually tunable first optical filer elements, the plurality of cascaded individually tunable first optical filter elements being a first plurality of filter elements, the first optical filter stage also including a first filter stage input port and a first filter stage throughput port, each of the first plurality of filter elements having a corresponding one of a plurality of element input ports, a corresponding one of a first plurality of output ports, and a corresponding one of a second plurality of output ports, each of the first plurality of filter elements being tunable, in response to first outputs from the controller, to pass a first subset of the plurality of optical channels through the first output port of each of the first plurality of filter elements to the tunable filter throughput port, each of remaining subsets of the plurality of optical channels being output from a corresponding one of the second plurality of output ports of the first plurality of filter elements, each optical channel within the first subset of the plurality of optical channels, and each optical channel within the remaining subsets of channels being spectrally spaced from one another by a first plurality of channel spacings;
 the tunable optical filter further including a second optical filter stage, which receives the first subset of the plurality of optical channels and has a second optical stage throughput port, the second optical filter stage optically communicating with the first optical filter stage throughput port, the second optical filter stage having a second periodic transmission spectrum and a plurality of cascaded individually tunable second optical filter elements, the plurality of cascaded individually tunable second optical filter elements being a second plurality of filter elements, each of the second plurality of filter elements having a corresponding one of a plurality of drop ports and a corresponding one of a plurality of pass-through ports, each of the second plurality of filter elements being configured to output, from a corresponding one of the plurality of drop ports, a corresponding one of a plurality of second subsets of the plurality of optical channels, wherein each of the second plurality of filter elements is tunable, in response to second outputs from the control circuit, to pass one of the optical channels in the first subset of the plurality of optical channels, and output each of a corresponding one of remaining ones of the optical channels within the first subset of the plurality of optical channels from a corresponding one of the plurality of drop ports, each optical channel within the plurality of second subsets of the plurality of optical channels being spectrally spaced from one another by a second plurality of channel spacings, a number of the first plurality of channel spacings being different than a number of the second plurality of channel spacings.

2. A wavelength division multiplexed optical communication system as recited in claim 1 wherein each of the first plurality of filter elements includes an optical resonator.

3. A wavelength division multiplexed optical communication system as recited in claim 2 wherein the optical resonator is a micro-ring optical resonator.

4. A wavelength division multiplexed optical communication system as recited in claim 2 wherein the tunable filter includes an optical waveguide.

5. A wavelength division multiplexed optical communication system as recited in claim 4, wherein the optical resonator is evanescently coupled to the optical waveguide.

6. A wavelength division multiplexed optical communication system as recited in claim 2 wherein the optical resonator includes a compound glass system.

7. A wavelength division multiplexed optical communication system as recited in claim 2 wherein the optical resonator includes a layered semiconductor system.

8. A wavelength division multiplexed optical communication system comprising:

a wavelength division multiplexed optical signal source outputting a wavelength division multiplexed optical signal, the wavelength division multiplexed optical signal including a plurality of optical channels, each of the plurality of optical channels having a corresponding one of a plurality of channel wavelengths, adjacent ones of the plurality of optical channels being spectrally spaced from one another by a channel spacing;

a tunable optical filter having a tunable filter input port and a tunable filter output port, the tunable optical filter being configured to receive at least a portion of the wavelength division multiplexed optical signal through the tunable filter input port, the tunable optical filter including at least a first tunable optical filter stage, the first tunable optical filter stage having a first periodic transmission spectrum, the first periodic transmission spectrum having a first free spectral range, the first tunable optical filter stage including a first plurality of filter elements;

the tunable optical filter further including a second tunable optical filter stage, the second optical filter stage optically communicating with the first tunable optical filter stage, the second tunable optical filter stage having a second periodic transmission spectrum, the second periodic transmission spectrum having a second free spectral range different from the first free spectral range of the first tunable optical filter stage, the second optical filter stage including a second plurality of filter elements; and a controller which alters the first periodic transmission spectrum of the first tunable optical filter stage and the second periodic transmission spectrum of the second tunable optical filter stage, such that a first subset of the plurality of optical channels is output from the first tunable optical filter stage to the second tunable optical finer stage, and each of remaining subsets of the plurality of optical channels is output from a corresponding one of the first plurality of filter elements in the first tunable optical filter stage, and the second tunable optical filter stage outputs one of the plurality of optical channels in the subset of the plurality of optical channels, and each of the second plurality of filter elements outputs a corresponding one of remaining ones of the optical channels in the subset of the plurality of optical channels, each optical channel within the subset of the plurality of optical channels and each optical channel within the remaining subsets of channels being spectrally spaced from one another by a first plurality of channel spacings, each of the second plurality of filter elements being configured to supply a plurality of second subsets of the plurality of optical channels, each optical channel within the plurality of second subsets being spectrally spaced from one another by a second plurality of channel spacings, a number of the first plurality of channel spacings being different than a number of second plurality of channel spacing.

9. A wavelength division multiplexed optical communication system as recited in claim 8 wherein each of the first plurality of filter elements includes an optical resonator.

10. A wavelength division multiplexed optical communication system as recited in claim 9 wherein the optical resonator is a micro-ring optical resonator.

11. A wavelength division multiplexed optical communication system as recited in claim 9 wherein the tunable filter includes an optical waveguide.

12. A wavelength division multiplexed optical communication system as recited in claim 11 wherein the optical resonator is evanescently coupled to the optical waveguide.

13. A wavelength division multiplexed optical communication system as recited in claim 9 wherein the optical resonator includes a compound glass system.

14. A wavelength division multiplexed optical communication system as recited in claim 9 wherein the optical resonator includes a layered semiconductor system.

15. A wavelength division multiplexed optical communication system as recited in claim 9 wherein the optical resonator includes a material system including silicon, silicon nitride, silicon oxynitride, or silicon carbide.

16. A wavelength division multiplexed optical communication system, comprising: a wavelength division multiplexed optical signal source outputting a wavelength division multiplexed optical signal, the wavelength division multiplexed optical signal including a plurality of optical channels, each of the plurality of optical channels having a corresponding one of a plurality of channel wavelengths, adjacent ones of the plurality of optical channels being spectrally spaced from one another by a channel spacing;

a tunable optical filter having a tunable filter input port and a tunable filter output port, the tunable optical filter being configured to receive the wavelength division multiplexed optical signal through the tunable filter input port, the tunable optical filter including at least a first tunable optical filter stage, the first tunable optical filter stage having a first periodic transmission spectrum, the first periodic transmission spectrum having a first free spectral range, the first tunable optical filter stage including a first plurality of filter elements;

the tunable optical filter further including a second tunable optical filter stage, the second optical filter stage optically communicating with the first tunable optical filter stage, the second tunable optical filter stage having a second periodic transmission spectrum, the second periodic transmission spectrum having a second free spectral range different from the first free spectral range of the first tunable optical filter stage, the second optical filter stage including a second plurality of filter elements; and a controller which alters the first periodic transmission spectrum of the first tunable optical filter stage and the second periodic transmission spectrum of the second tunable optical filter stage, such that a first subset of the plurality of optical channels is output from the first tunable optical filter stage to the second tunable optical filter stage, and each of remaining subsets of the plurality of optical channels is output from a corresponding one of the first plurality of filter elements in the first tunable optical filter stage, and the second tunable optical filter stage outputs one of the plurality of optical channels in the subset of the plurality of optical channels, and each of the second plurality of filter elements outputs a corresponding one of remaining ones of the optical channels in the subset of the plurality of optical channels, each optical channel within the subset of the plurality of optical channels and each optical channel within the remaining subsets of channels being spectrally spaced from one another by a first plurality of channel spacings, each of the second plurality of filter elements being configured to supply a plurality of second subsets of the plurality of optical channels, each optical channel within the plurality of second subsets being spectrally spaced from one another by a second plurality of channel spacings, a number of the first plurality of channel spacings being different than a number of second plurality of channel spacing, wherein the first free spectral range is greater than the second free spectral range.

\* \* \* \* \*